US006952156B2

(12) United States Patent
Arshad et al.

(10) Patent No.: US 6,952,156 B2
(45) Date of Patent: Oct. 4, 2005

(54) TRANSPONDER COMMUNICATION AND CONTROL SYSTEM FOR A VEHICLE

(75) Inventors: Mohammad J. Arshad, Naperville, IL (US); Alan D. Berger, Winfield, IL (US); Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 295 days.

(21) Appl. No.: 09/752,009

(22) Filed: Dec. 28, 2000

(65) Prior Publication Data

US 2002/0084887 A1 Jul. 4, 2002

(51) Int. Cl.[7] ................................................ G05B 19/00

(52) U.S. Cl. ...................... 340/5.6; 340/5.64; 340/5.61; 340/5.2; 340/5.65; 340/5.25; 701/36

(58) Field of Search ................................ 340/5.2, 5.61, 340/5.25, 5.53, 5.64, 825.61, 825.69; 701/50

(56) References Cited

U.S. PATENT DOCUMENTS

| | | | | |
|---|---|---|---|---|
| 4,852,680 A | | 8/1989 | Brown et al. | |
| 5,369,581 A | * | 11/1994 | Ohsuga et al. | 701/48 |
| 5,508,694 A | | 4/1996 | Treharne et al. | |
| 5,528,843 A | * | 6/1996 | Rocke | 37/348 |
| 5,610,574 A | | 3/1997 | Mutoh et al. | |
| 5,745,026 A | | 4/1998 | Kokubu et al. | |
| 5,808,372 A | * | 9/1998 | Schwegler et al. | 340/5.64 |
| 5,815,071 A | * | 9/1998 | Doyle | 340/439 |
| 5,886,421 A | | 3/1999 | Mizuno et al. | |
| 5,969,633 A | | 10/1999 | Rosler | |
| 6,020,827 A | | 2/2000 | Konrad et al. | |
| 6,025,653 A | | 2/2000 | Hayashi et al. | |
| 6,144,113 A | | 11/2000 | Hayashi et al. | |
| 6,154,694 A | | 11/2000 | Aoki et al. | |
| 6,225,890 B1 | | 5/2001 | Murphy | |
| 6,269,292 B1 | | 7/2001 | Kokubu et al. | |
| 6,380,842 B1 | | 4/2002 | Mattes et al. | |
| 6,430,488 B1 | * | 8/2002 | Goldman et al. | 701/36 |
| 6,480,117 B1 | * | 11/2002 | Flick | 340/825.69 |
| 6,496,107 B1 | | 12/2002 | Himmelstein | |
| 6,501,369 B1 | | 12/2002 | Treharne | |
| 6,522,251 B1 | | 2/2003 | Menne et al. | |
| 6,538,557 B1 | * | 3/2003 | Giessl | 340/5.2 |
| 6,552,648 B1 | * | 4/2003 | Rick et al. | 340/5.1 |
| 2002/0019689 A1 | | 2/2002 | Harrison et al. | |

* cited by examiner

*Primary Examiner*—Michael Horabik
*Assistant Examiner*—Vernal Brown
(74) *Attorney, Agent, or Firm*—Collin A. Webb

(57) ABSTRACT

A method and system for controlling the operation of a vehicle is disclosed that includes a radio frequency transponder and a vehicle configured to respond to data stored in the transponder by preventing or disabling operation of the vehicle under certain conditions indicated by data stored in the transponder. A communications controller receives the data from the transponder, then monitors the operation of the vehicle to make sure it is operated within the limits that are stored in the transponder. By communicating with other controllers on the vehicle that are in charge of other subsystems, it receives information relating to whether the operational limits of the vehicle have been approached or exceeded, and takes appropriate action in that event, the action may include not enabling the vehicle initially, or disabling the vehicle, or causing an operator display to indicate which limit has been exceeded or approached.

21 Claims, 3 Drawing Sheets

TRANSPONDER COMMUNICATION AND CONTROL SYSTEM FOR A VEHICLE

BACKGROUND OF THE INVENTION

Fleets of vehicles, such as taxis, rental cars, construction and agricultural vehicles are most often intended for the use of many individuals. Since these vehicles were typically designed for single owner-operators, they have traditionally been configured to either permit or deny total access or control based upon the use of an ignition key. Anyone with the ignition key is permitted complete access to the vehicle simply by inserting the key into a lock.

In recent years, various accessory devices for cars and other vehicles have been devised, such as AM/FM radios, tape players, CD players, electronic maps and the like. These systems have typically been connected to the vehicle, as manufactured, by tapping into the electrical power system. To reduce the risk of theft, they have been protected by passwords or special electrical keys that permit or deny access to those devices based on the knowledge of special codes, or the operation of special radio transmitters.

Other devices such as radio controlled car locks, remote car starters and anti-theft systems have also been developed that permit individuals owning the vehicles to control access to their vehicles. Radio transmitters in small key fobs that have one or more buttons communicate with a radio receiver on the vehicle when the buttons are pressed to perform a wide variety of functions, such as unlocking or locking doors, beeping a horn, turning on the engine or the like.

A different situation exists when vehicles are used in fleets. Fleet vehicles, such as delivery trucks, taxis, delivery vans, construction vehicles and the like, may be operated by several individuals, wherein each of the operators is permitted to do only certain things with the vehicle. A delivery driver of a vehicle on one particular route may only be permitted to operate the vehicle on his route, whereas a different driver operating the same vehicle may only be permitted to operate the vehicle on a different route.

A consumer renting a car may be permitted to drive a rental car for only a predetermined distance under the terms of his rental agreement. After the predetermined number of miles has elapsed, he may not be permitted to use the car, whereas another driver may be permitted to use the car at all. One operator of a loader/backhoe may be permitted to drive the vehicle down a road since he has a vehicle driver's license, and another operator of the loader/backhoe may be permitted to operate only the backhoe once the vehicle has stopped.

The communications devices currently used with vehicles do not allow the operation of a vehicle to be parsed on such a case-by-case basis. If a rental car is rented, for example, the operator is given the ignition key together with the radio transmitter key fob. The vehicle, so to speak, does not "know" one user from another, since there is only a single key fob and key that are useable to unlock the doors and start the car. The car responds in an identical fashion to the original ignition key or any duplicate, and to the original radio transmitter key fob or any duplicate. If the ignition key and radio transmitter key fob of one vehicle are exchanged for another ignition key and key fob that are keyed to another vehicle, neither vehicle can be operated.

A better system is needed to manage vehicles in fleets. For fleet management, it would be beneficial to give different levels of access to different users, all of whom can operate the same vehicle. It is also beneficial to give one person access to a variety of vehicles, each vehicle of which may provide that person with vehicular access different than the access those vehicles provide to a different person. It would also be beneficial to permit each user to carry around his or her authorization or access levels with them from vehicle to vehicle.

One important subcomponent to a fleet management system such as this is the apparatus by which the vehicles recognize each individual user. The present application is directed to that subcomponent: an improved way of identifying an operator to a vehicle.

SUMMARY OF THE INVENTION

It is an object of the present invention to provide a method of controlling the operation of a vehicle with a radio communications circuit configured to communicate with a vehicle operator's handheld radio frequency transponder, the method comprising the steps of providing the vehicle having the bi-directional radio communications circuit, providing the radio transponder to the vehicle operator, generating electromagnetic radiation from the radio communications circuit, bringing the transponder within the range of the electromagnetic radiation, energizing the transponder by the electromagnetic radiation, transmitting first information from the transponder after the step of energizing the transponder, receiving at the reader circuit the first information transmitted by the transponder, and controlling at least one subsystem of the vehicle in response to the first information received at the transponder.

The step of providing the radio transponder may include the step of providing the radio transponder with a low-power microcontroller configured to receive its operating power from the electromagnetic radiation.

The step of providing the radio transponder may include the step of molding the radio transponder into a vehicle ignition key.

The step of providing a radio transponder may include the step of embedding the radio transponder in a hand-held card.

The step of providing a radio transponder may include the step of mechanically bonding the radio transponder to a vehicle ignition key.

The step of transmitting the first information may include the step of transmitting a digital value that identifies the operator.

The step of controlling at least one subsystem may include the step of comparing the digital value that identifies the operator with a value previously stored in the vehicle's controller.

The step of controlling at least one subsystem of the vehicle may include the step of disabling the operation of one or more of the following subsystems: a fuel pump of the vehicle, a hydraulic system of the vehicle, a starting system of the vehicle, an electrical system of the vehicle, a transmission of the vehicle and/or an engine of the vehicle.

A still further object of the present invention is a method of controlling the operation of a vehicle in response to data received from a radio transponder, the vehicle having a short-range radio transceiver configured to selectively energize the transponder when it is in close proximity to an operator's station of the vehicle, the method includes the steps of storing data in the transponder indicative of the operator; bringing the transponder into close proximity of the operator's station of the vehicle; generating by the vehicle of an electromagnetic field sufficient to energize the transponder; downloading from the transponder to the vehicle the data indicative of the operator; comparing by the vehicle of the downloaded data indicative of the operator with data previously stored in the vehicle; and limiting the functionality of the vehicle based upon the step of comparing.

The data indicative of the operator may include data indicative of the vehicle operational parameters.

The operational parameters may include a distance traveled, a geographical area in which the vehicle may be driven, times of the day during which operation is permitted, an elapsed time of operation, a maximum engine load, and a maximum speed of the vehicle.

A still further object of the present invention is a system for controlling the operation of a vehicle comprising a portable radio transponder including a microcontroller and an digital memory, wherein the digital memory includes data indicative of an operator of a vehicle, the vehicle further comprising a transponder reader circuit configured to transmit electromagnetic radiation sufficient to energize and enable the transponder to transmit the data at a transponder radio frequency and a control system configured to input the data from the transponder reader circuit and to control operation of the vehicle in response to the data.

The control system may be configured to set a vehicle speed limit based upon the data received from the transponder, to set a maximum engine RPM based upon the data received from the transponder, to set a maximum engine load based upon the data received from the transponder, to disable the vehicle after a predetermined amount of time of operation based upon the data received from the transponder, to disable the vehicle if it travels outside a predetermined geographical area of operation, and to prevent the operation of the vehicle outside of predetermined time intervals each day based upon the data received from the transponder.

BRIEF DESCRIPTION OF THE DRAWINGS

The invention will become more fully understood from the following detailed description when taken in conjunction with the accompanying drawings. Like reference numerals refer to like parts.

DETAILED DESCRIPTION OF THE PREFERRED EMBODIMENT

Figure 1:
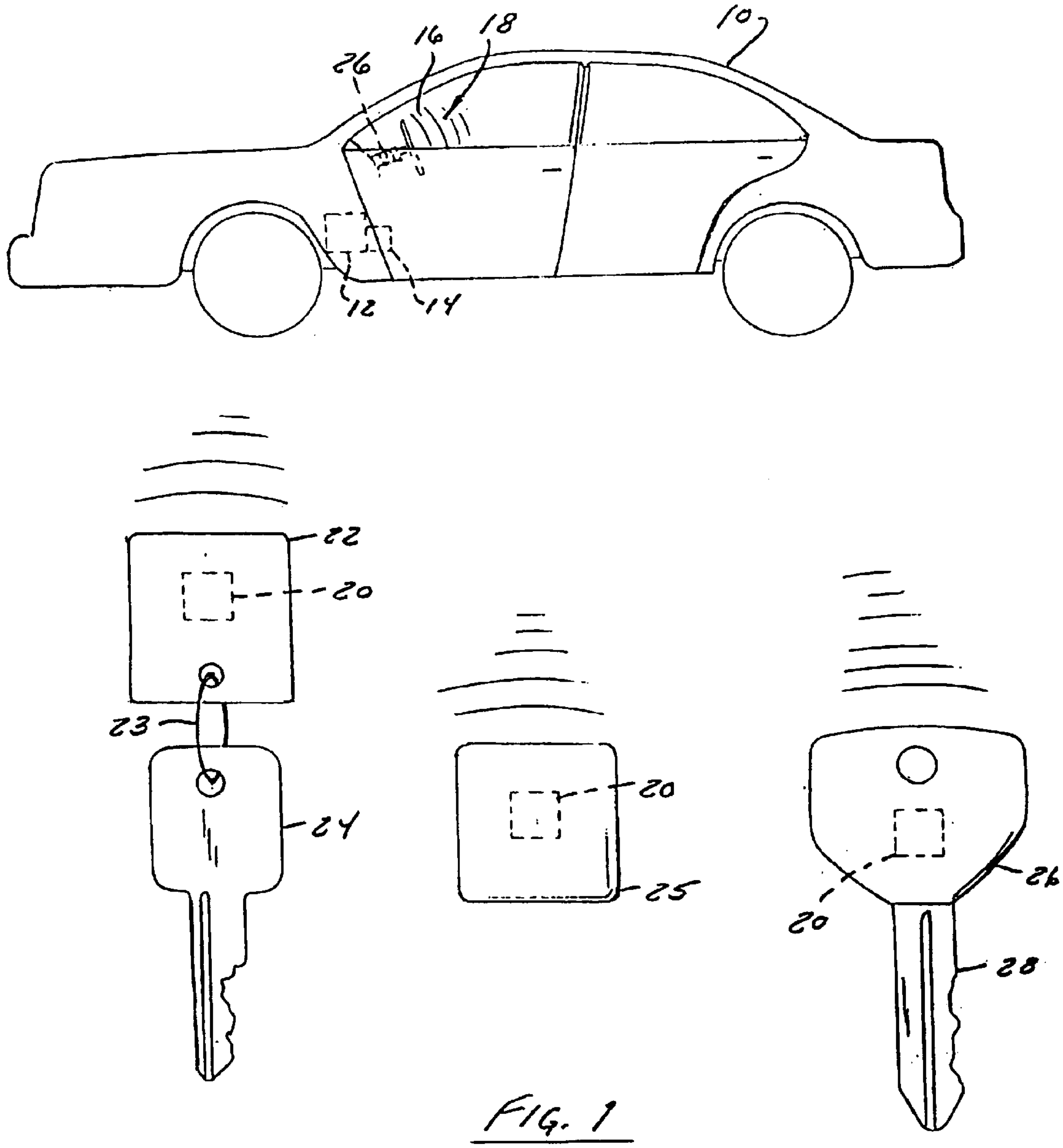
FIG. 1 illustrates the overall system, including a vehicle with a control system that is configured to communicate with a radio transponder.

Referring to FIG. 1, a vehicle 10 has a control system 12 that includes a reader circuit 14. This reader circuit generates an electromagnetic field 16 into the operator's station 18 of the vehicle and preferably in the local vicinity of the station. This electromagnetic field impinges on a transponder 20 that is carried by the operator to the vehicle. When the operator is adjacent to or in the vehicle, the electromagnetic field is sufficiently strong that it can energize transponder 20. In response to being energized, the transponder transmits data over radio waves to the reader circuit which reads the data and takes predetermined actions based upon that data.

The transponder may be provided in one of several preferred forms. Transponder 20 may be in the form of a key fob, preferably molded into a plastic case 22 impervious to moisture (under typical operating conditions). Case 22 is mechanically coupled to an ignition key 24 by strap 23. Key 24 is configured to fit into and turn ignition switch 26 of the vehicle. In this arrangement the ignition key permits the operator to start the vehicle engine. Transponder 20 is accessed by the vehicle to determine what vehicle functions, operations, systems or sub-systems the operator is permitted or not permitted to use.

Transponder 20 may alternatively be molded into a thin credit card-sized sheath 25. Again, it is preferably impervious to moisture under ordinary operating conditions. In this form, transponder 20 is not mechanically coupled to a key, and is therefore easily carried in the operator's wallet, shirt pocket or pants pocket.

Transponder 20 may alternatively be molded into the plastic handgrip 26 of an ignition key 28.

Figure 2:
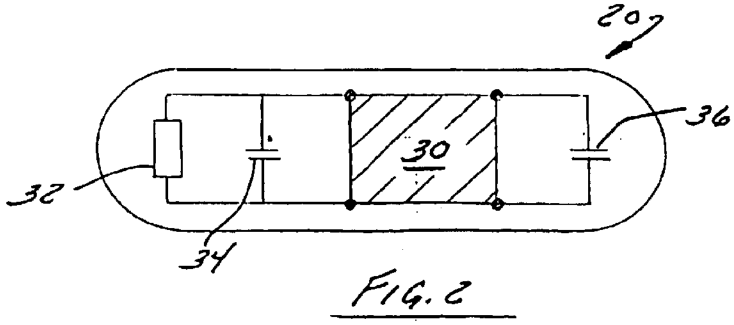
FIG. 2 is a detailed view of the transponder showing the microcontroller, digital memory and the antenna.

Referring now to FIG. 2, the transponder includes a microcontroller 30 in an integrated circuit package, an antenna 32 and a resonance capacitor 34 in series. A charge capacitor 36 is coupled to package and functions as a power source. The transponder is preferably one of Texas Instruments RFID products more preferably one of their Multipage Transponders (MPT), Selective Addressable Multipage Transponders (SAMPT), or Selective Addressable Multipage Transponders (Secure) (SAMPTS). Other's that are acceptable include Microchip's, Motorola's, or Temic's transponders. These microcontrollers are programmed to provide individual and selectable read (and read-write) access to their internal digital memory. Their internal memory space preferably contains 80 or more bits of stored information. The memory is preferably arranged in separately addressable pages of memory.

To energize the transponder, it is placed in an oscillating electromagnetic field 16 generated by the reader circuit 14 (FIG. 1). This field oscillates at the resonant frequency of the antenna 32 and resonance capacitor 34, causing an oscillating current to build up between these two components. This oscillating current charges capacitor 36. The charge saved in capacitor 36 is then used to power microcontroller 30.

Once microcontroller 30 is powered, it filters the signal that is generated in the antenna and resonance capacitor and extracts superimposed data carried by the electromagnetic field. Based on preprogrammed instructions that it contains in an integral read-only memory, microcontroller 30 responds to the received data, which includes read (and preferably write) instructions. If the received instructions are read instructions, microcontroller 30 selects a particular data item from its internal memory to be transmitted to the vehicle, and transmits this data via antenna 32. Reader circuit 14 receives the information transmitted by the transponder, and processes it accordingly. If the instructions are write instructions, microcontroller 30 receives data from the vehicle via field 16 and stores this data in its internal memory.

In a first embodiment, the data stored in the memory of microcontroller 30 may include numeric values that are remotely downloaded into the transponder and are indicative of (1) a total distance which the operator is permitted to travel, (2) a geographical area in which the vehicle may only be operated, (3) allowed times and dates of operation, such as (i) the specific hours during the day when the vehicle may be operated or (ii) the specific dates on which it may be operated, (4) the total time of permitted operation, and (4) the permitted subsystems that the operator is allowed to use.

In a second embodiment, the data stored in microcontroller 30 of the transponder may also include data downloaded from the vehicle itself, such as (1) the distance traveled by the vehicle, (2) the date and times of specific events, such as the time the vehicle was started, the time the vehicle was stopped, (3) time-triggered elapse records, such as service reminders, and a vehicle rental period expiring, (4) vehicle conditions, such as a threshold or maximum engine load experienced by the vehicle during operation, (4) the current odometer reading, (5) fault or error conditions experienced during operation, such as low fuel conditions, low oil or oil pressure conditions, engine coolant over-temperature, engine electrical output too low or too high, and (6) amount of consumables remaining in vehicle, such as the fuel level, coolant level, oil level, and hydraulic fluid level.

Figure 3:
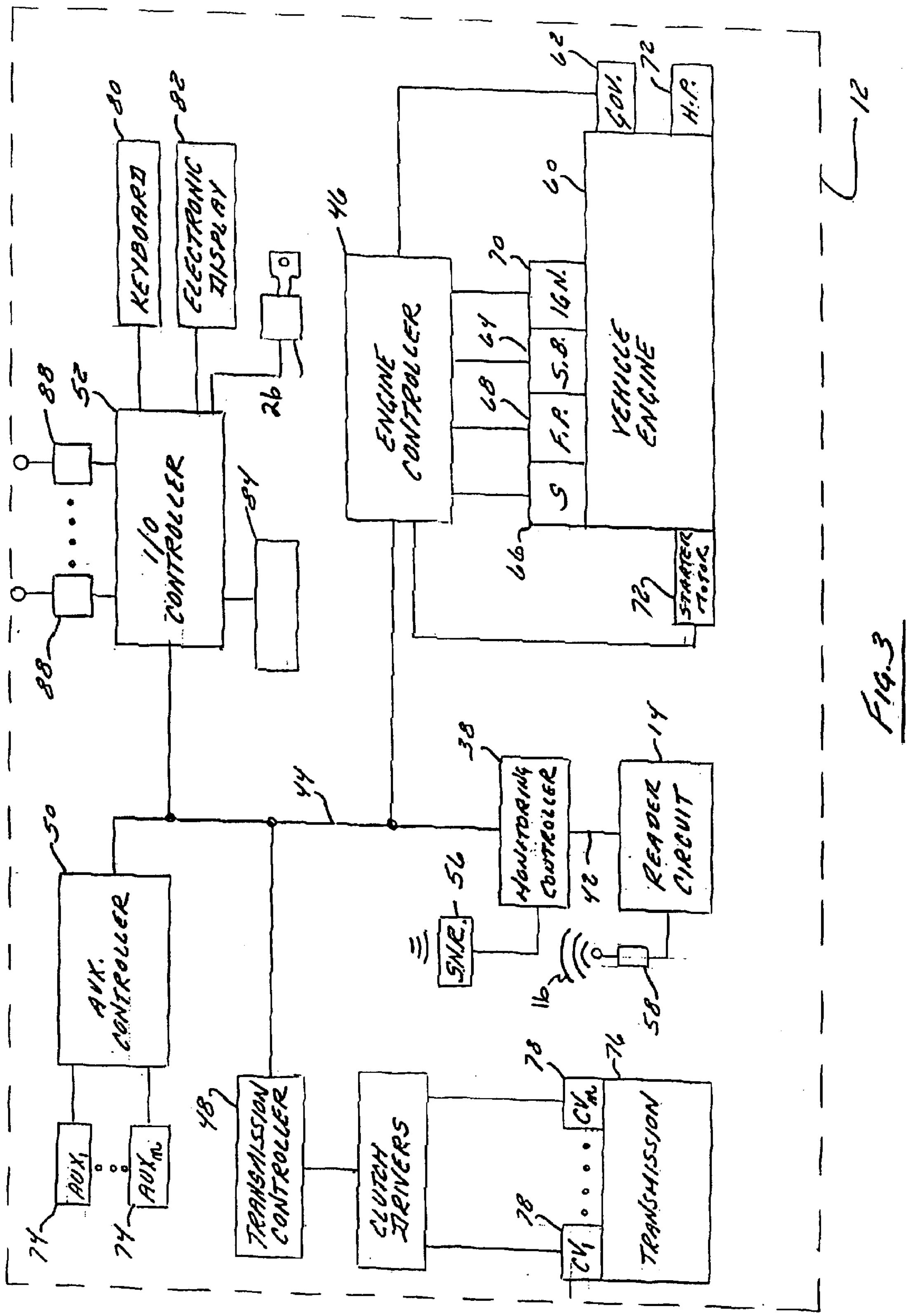
FIG. 3 is a detailed view of the vehicle's control system showing the plurality of vehicle subsystems or components and their interconnections, including the reader that reads the transponder.

FIG. 3 shows vehicle control system 12 of FIG. 1 in more detail. Control system 12 includes a vehicle status and monitoring controller 38 that is coupled to reader circuit 14 over an RS485 telecommunications link 42. System 12 also includes several other microprocessor-based controllers that are coupled together with monitoring controller 38 by vehicle serial bus 44. These controllers include an engine controller 46, a transmission controller 48, an auxiliary controller 50, and a user I/O controller 52.

Monitoring controller 38 is coupled to a satellite navigation receiver 56 that is configured to receive radio transmissions from satellites and to convert them into data indicative of the vehicle's current location such as latitude and longitude. Controller 38 is also coupled to reader circuit 14 that communicates with transponder 20.

Reader circuit 14 includes a radio frequency module, such as Texas Instruments' RI-RFM-007B and a control module such as Texas Instruments' RI-CTL-MB6A. The control module is the interface between the radio frequency module and controller 38. The control module controls the transmitting and receiving functions of the radio frequency module according to commands sent over the serial connection from controller 38 to the control module. The control module decodes the received RF signals, checks their validity and handles their conversion to a standard serial interface protocol—which, in the preferred embodiment, includes an RS-485 interface. Hence the RS 485 serial communication link 42 between reader circuit 14 and controller 38.

Controller 38 directs reader circuit 14 by issuing several commands over the RS-485 connection to the control module. These commands include a query command to query for any transponder in range, and a specific query command to query for a specific transponder by its embedded identification number. While it is possible for all the vehicle and operator information in transponder 20 to be transmitted as one long string of bits, it is more efficient and fast to arrange such data into a series of "pages" in transponder 20, pages that can be individually retrieved by controller 38 on a page-by-page basis. In this manner, controller 38 need not wait until the entire contents of transponder 20 are downloaded to reader circuit 14 and hence to controller 38, but can selectively request specific items of information that are specific to the particular task that controller 38 is attempting to perform.

This specific query command causes reader circuit 14 to generate and transmit radio signals through antenna 58 into the surrounding environment of the operator's station and near proximity to the operator's station. If any transponder is close enough to be energized by the electromagnetic field 16 generated by antenna 58, it is energized and internally checks to see if it has the identification number broadcast by antenna 58. If so, it responds with an affirmative message, and thereby establishes a communication session with controller 38.

On the other hand, if a general query is transmitted, all transponders in the vicinity (i.e. close enough to be energized) will respond to the transmission with a response that includes their identification number. The transponders are a part of a system wherein each operator has his own transponder and is preferably uniquely identified by their transponders. Hence, each transponder in the fleet management system preferably has a different identification number stored in its memory in microcontroller 30, and thus can uniquely identify the person carrying the transponder. By using the general query, reader circuit 14 can single out and identify any transponder within range. It can subsequently single out and communicate with each transponder in range by transmitting successive specific queries that successively identify each of the transponders in the vicinity.

Once the reader circuit 14 establishes the existence of a particular transponder or transponders within the range of its antenna 58, it then continues the communications session by sending a request to the transponder to download information from the memory of microprocessor 30 to the reader circuit and thence to controller 38 for processing. Transponders currently commercially available have a limited amount of memory that can be written to or read from. As transponders develop, more and more memory space in transponders will be available for storage and retrieval. As a result, it may take a significant period of time to transmit all the operator information from the transponder to the vehicle when the operator approaches the vehicle to start it. As a result, the operator may wait for a significant period of time for the initial communication session to complete and controller 38 to permit the vehicle to be operated.

To speed up this initial communication between the transponder and the vehicle, reader circuit 14 can continuously and periodically transmit general or specific queries. In this manner, as a potential operator with a transponder approaches the vehicle or enters the vehicle's cabin or operator's station, the initial communication between the transponder and the vehicle can commence automatically without special operator intervention to initiate it. Once the operator is within range, the transponder will be automatically energized by field 16, and will transmit the information requested by the vehicle even before the operator has situated himself in the operator's seat and attempts to start the vehicle's engine.

By the time the operator indicates that he wishes to start the vehicle, such as by operating the ignition switch 26 with a key, or pressing an "engine start" or other similar button on keyboard 80, the initial communication between the operator's transponder and the vehicle's control system will have provided the control system with the information it needs to determine whether or not the operator is permitted to operate the vehicle. There will be no significant delay between the time the operator starts the engine and the vehicle gets underway.

There are drawbacks to this automatic and periodic querying in the vicinity of the vehicle, however. It can cause the vehicle's battery to drain. If the electromagnetic field extends outside the vehicle, the transponder of someone passing nearby the vehicle can be inadvertently energized, and the vehicle would then mistakenly gather information and prepare for vehicle operation. Someone could sit in the vehicle briefly, inadvertently establish communication with the vehicle control system due to its automatic querying, then depart after the vehicle gathered data from that person's transponder and assumed that person was going to operate the vehicle. A second person might then sit in the vehicle and operate it. This would be especially problematic if there were no special device, such as a key, required for operation.

To reduce the risk of a stray passing transponder initializing the vehicle, the transponder 20 and the antenna 58 of reader circuit 14 are preferably configured such that the transponder must actually be inside the vehicle before the electromagnetic field is sufficient to energize the transponder. Alternatively, they are configured such that the transponder is energized even when outside the vehicle, but the radio signal transmitted by the transponder is not sufficiently strong (from outside the vehicle) to return to the circuit 14. In either case, a passing transponder will not inadvertently establish communication with reader circuit 14.

In a further alternative embodiment, controller 38 can be configured to wait until someone engages a switch on the vehicle (preferably, but not necessarily ignition switch 26) before it signals reader circuit 14 to generate the electromagnetic field that energizes the transponders and subsequently to query the transponder (or transponders, as the case may be) in the vicinity of reader 14. By waiting until the operator engages a switch or other user interface before generating the electromagnetic field in response to an affirmative action by the operator, vehicle battery life is substantially extended.

In the event ignition switch 26 is used, the switch will be permitted to start the vehicle in a typical fashion, but any additional functions will not be enabled until controller 38 has received the data stored in transponder 20 and determined whether the operator is permitted to operate specific vehicle systems. During this process, controller 38 will not authorize the transmission controller to engage the transmission in a gear ratio. Once the data has been received by reader circuit 14, it is formatted and transmitted to controller 38 for processing.

Controller 38 also communicates with the other controllers by transmitting packets of data on the communications bus 44 extending between the various controllers on the vehicle. These packets of data may be broadcast to all the controllers with a header indicating the contents of the packet, or they may be transmitted to individual controllers with a header including a controller address identifying the controller to which they are addressed, as well as information indicating the contents of the data in the packet. Any of the data items received from transponder 20 can be transmitted in this manner.

Controller 38 receives packets of data indicative of vehicle status and events that are transmitted by the other controllers on the CAN bus such as the engine RPM, engine load, engine throttle position, the distance traveled, elapsed time since last oil change, the oil change intervals, the engine oil temperature, the engine coolant temperature, the engine oil level, the elapsed hours of engine operation, error conditions experienced by any of the controllers, the vehicle's geographical location, as well as any operator requests to operate specific subsystems or subcomponents of the vehicle.

Controller 38 periodically compares the data it has received from the other controllers and from its own sensors (the receiver 58) with the transponder data it received from the transponder to determine whether the operator has attempted to exceed any of the operational limits that were indicated by the transponder data. For example, if the engine may be operated for only a predetermined number of hours, controller 38 compares the elapsed engine hour data received from the engine controller with the permitted hours received from the transponder and performs one or more predetermined functions based upon the result of that comparison.

If these limits are exceeded, and depending upon the priority of the particular transponder limits, controller 38 will transmit a packet that shuts down a particular vehicle subsystem. For example, by directing the engine controller 46 to shut down the fuel pump, the ignition system, or to limit the speed of the vehicle or the engine. At substantially the same time, controller 38 will preferably transmit a packet to I/O controller 52 commanding it to display a message indicating what limit has been exceeded.

In other cases, especially if the priority of the limits is lower, controller 38 may only send a packet to the I/O controller 52 telling it to display a message indicating that a particular limit has been exceeded, but not sending a packet to engine controller 46 directing it to shut down any or all of the sub-system it controls. For example, if the vehicle is a rental car and it is traveling down the highway at 60 miles per hour, common sense would dictate that the engine cannot be stopped immediately. Hence, exceeding a permitted distance of travel or permitted zone of travel while the vehicle is moving at a predetermined speed or greater would be a low priority message and controller 38 would not shut the engine sub-systems down. On the other hand, if the operator is only permitted to use the car's radio for 10 miles, the radio could indeed be shut down immediately causing no problems (a high priority message).

Engine controller 46 is coupled to the vehicle's engine 60 which it monitors and controls. Engine 60 may be a spark ignition or a diesel engine. The way engine controller 46 controls the engine is by sending a signal to the engine's governor 62 typically indicative of a commanded fuel flow rate or power output. The governor, in response to this signal, varies the rack position of the fuel injector system (i.e. a mechanical system), or transmits an electronic signal to each of the fuel injectors (if an electrical injector system). Alternatively, it may open or close a combustion air valve or "throttle valve" that regulates the flow of air to each combustion chamber of the engine. The governor, if electronic, transmits a signal back to engine controller 46 that is indicative of the speed of the engine. As an alternative, a separate engine speed sensor 64 can be provided, such as a shaft speed sensor or a sensor that monitors the fluctuations in electricity coming out of the engine's alternator. The frequency of these fluctuations are proportional to the speed of the engine.

Engine controller 46 is also coupled to several sensors 66 that are themselves coupled to the engine to generate signals indicative of oil pressure (oil pressure sensor), oil temperature (oil temperature sensor), coolant water temperature (coolant temperature sensor), engine speed (sensor 64) and engine load.

Engine controller 46 is also coupled to fuel pump 68 to either enable or disable the fuel pump by connecting or disconnecting power to the pump. The fuel pump itself uses mechanical or electrical feedback to automatically maintain the desired fuel pressure of the fuel provided to the engine.

Engine controller 46 is also coupled to ignition system 70 of the engine (in the case of spark ignition engines) to either energize or de-energize the ignition under computer control. In addition, engine controller 46 is coupled to the engine starting motor 72 to turn motor 72 on or off under computer control.

The engine controller is therefore configured to monitor various conditions of the engine, as well as directly control the operation of the engine by selectively enabling or disabling engine subsystems such as ignition, fuel, and starting.

Auxiliary controller 50 controls the operation of various hydraulically powered subsystems of the vehicle. Engine 60 drives a hydraulic fuel pump 72 that provides a source of pressurized hydraulic fluid. This fluid is controlled and directed by auxiliary controller 50. Auxiliary controller 50 is coupled to and drives several auxiliary hydraulic valves 74 ($AUX_1 \ldots AUX_n$). These valves are typically on-off valves or pulse-width modulated proportional control valves that regulate the flow of hydraulic fluid. If vehicle 10 is a backhoe or has a backhoe attachment, for example, controller 50 and valves 74 controls the flow of fluid to a boom swing cylinder, a boom lift cylinder, a dipper cylinder and a bucket cylinder, which are each coupled to and controlled by at least one aux valve 74. One or more additional valves are provided to control the flow of hydraulic fluid to or from various hydraulically driven implements that are mounted on the end of the backhoe arm. If the vehicle is a dump truck, for example, controller 50 controls the flow of fluid to and from the cylinders that lift the box of the truck to dump it. If the vehicle is a loader, loader/backhoe, bulldozer, or skid steer loader, for example, controller 50 regulates the flow of fluid to and from the arm and bucket cylinders (as the case may be) that raise, lower, and tilt the bucket. The operator can be permitted or denied the operation of any or all of these subsystems by data in the transponder.

Transmission controller 48 controls the shifting of the vehicle's transmission 76. Controller 48 is coupled to and drives several clutch control valves 78 ($CV_1 \ldots CV_n$ in FIG. 3) that in turn control the flow of hydraulic fluid to and from hydraulic clutches in the transmission. These valves, depending upon the type of clutches employed, may be on-off valves or proportional control valves.

Controller 48 is also configured to select the particular clutches necessary to engage the transmission in a particular gear ratio and sequentially energizes the clutch control valves 78 such that appropriate gears and shafts are engaged. The transmission is preferably a powershift transmission in which most, if not all, of the gear ratios of the transmission are selectable by filling one or more hydraulic clutches coupled to valves 78.

Input/output controller 52 drives and responds to operator interface devices including keyboard 80, display 82, audio annunciator 84, and optional key switch 26. In addition, one or more control levers 88 are provided for operating the valves controlled by controller 50.

It is through these input devices that the operator communicates with the vehicle. The keyboard may be arranged as a closely spaced array of buttons, or the buttons may be spread out around the operator's station to make them easier to operate.

Display 82 is preferably a liquid crystal display, an electroluminescent display or the like having a region for displaying alphanumeric messages. This region is configured to display a plurality of different messages indicating the data stored in transponder 20 as well as information regarding the status of the vehicle, such as alarm conditions including (1) engine coolant water temperature too high, (2) engine coolant level too low, (3) engine lubricating oil temperature too high, (4) engine lubricating oil pressure too low, (5) hydraulic fluid pressure too low, or (6) hydraulic fluid temperature too high. Display 82 is preferably a multi-line display.

In addition, display 82 is configured to display the status of the vehicle based upon data retrieved from the transponder. For example, if the operator is not permitted to operate a particular subsystem of the vehicle as indicated by the data downloaded to controller 38 from transponder 20, display 82 is configured to display these limitations on display 82 at substantially the same time that the operator starts the vehicle. Some of the data downloaded from the transponder to controller 38 indicates limits on use of the vehicle such as the number of hours of permitted use, the total distance of permitted travel, the maximum speed of permitted operation, the maximum load on the engine and the geographical area in which the vehicle is permitted to operate. These are conditional limitations, since they may never prevent use of the vehicle unless they are exceeded. For this reason, display 82 is also configured to display messages as these limits are approached.

If the vehicle approaches its geographical limits of operation as determined by the controller 38, for example, display 82 is programmed to display an alphanumeric message indicating this impending condition with a notice such as "This vehicle cannot be used outside of Michigan."

When the operator approaches the maximum number of hours or miles of operation as determined by controller 38, display 82 is configured to display an alphanumeric message indicating this impeding condition, by displaying a message such as "Only 15 minutes left to operate the vehicle" or "Only fifteen miles left to operate the vehicle". Similar messages are displayed when the vehicle approaches its maximum permitted speed and maximum permitted load as indicated by data downloaded from the transponder.

Other data downloaded from transponder 20 may indicate other limits on operation, such as the operator not being permitted to operate specific sub-systems of the vehicle, such as (1) the various hydraulically actuated devices (e.g., front loader, backhoe, dozer blade, fork lift, or road grader blade hydraulic actuators) that are attached to or an integral part of the vehicle, or (2) to gain physical access to parts of the vehicle, such as by preventing the glove compartment latch, engine compartment latch, gas tank cover latch or trunk latch from being operated, which would thereby permit access to these compartments, or (3) preventing various accessories from being operated, such as a radio, vehicle heater, air conditioner, tape or CD player, navigation computer, or TV.

In the case of these various devices and subsystems that may be impermissible to use, display 82 is configured to generate an alert message at substantially the same time that the operator attempts to use them by displaying an appropriate message preferably indicating both (1) that use is not permitted, and (2) the device the operator attempted to operate.

This message could be displayed symbolically. For example, if the transponder indicated that the backhoe was not permitted to be used, it could display a device symbol in the shape of the backhoe (the device) with the international "not permitted" symbol of a red circle with a diagonal line through it superimposed on top of the device symbol when the operator moved levers 88 in an attempt to move the backhoe by operating valves 74. Alternatively, this message could be displayed in words. For example: "The backhoe may not be used".

Input/output controller 52 is also configured to energize audio alarm 84 substantially simultaneously with the appearance of a message to draw the operator's attention away from the device he is attempting (and not permitted) to operate and to the appropriate message on display 82.

All the controllers on bus 44 are in constant communication with each other while the vehicle is operated. As the transmission controller changes gear ratios and shifts the transmission, it packetizes information indicating the gear ratio or occurrence of a shift and places it on the bus for the other controllers to use.

As the engine controller controls the operation of the engine, it packetizes information relating to the engine and places that information on the bus for the other controllers to use. This information includes such data as the engine speed, values indicative of the various engine oil and water temperatures and pressures provided by the sensors, and the total elapsed hours of engine operation discussed above.

As the auxiliary controller operates the various hydraulic valves, it packetizes information indicating which valves 74 are open and closed, and by how much they are opened and closed, and places these packets on the bus for the other controllers to use.

As the input/output controller monitors the user input devices including levers 74, keyboard 80 and switch 86, it packetizes these operator requests and places the packets on the bus indicating the particular operational requests made by the operator. These include, but are not limited to, packets indicating the operator's attempts to operate the various subsystems of the vehicle he is not permitted to operate.

The communications controller similarly packetizes the data it receives from the transponder and places it on the bus for the other controllers to use.

In this manner each controller is made aware of the state of the various devices and actuators controlled or monitored by the other controllers.

Just as the various controllers are configured to transmit packetized information on bus 44 for use by other controllers, they are also configured to receive packetized information transmitted from the other controllers and use this data internally for their own programmed operations.

Controller 38, for example monitors the status of information transmitted by the other controllers that is indicative of the status of the other controllers and the subsystems and components to which they are attached. For example, when the operator manipulates levers 88 in an attempt to move the various hydraulic components that are controlled by auxiliary controller 50, I/O controller 52 places a packet indicative of this request on bus 44. Controller 38 reads this packet and compares the operator request with the data it has received from transponder 20 and determines whether the operator is permitted to operate the requested hydraulic device. If so, controller 38 signals its approval by packetizing and forwarding the request to controller 50. Alternatively, if the operator is not permitted to operate the device (typically a hydraulic actuator or actuators controlled by valves 74), controller 38 will not forward the operator request to controller 50. Instead, controller 50 will send a packet to controller 52 directing it to display a message indicating that the requested operation is not permitted. Controller 52, when it receives this packet of information will responsively display an alert message as discussed above, and will optionally energize annunciator 84, causing it to generate a sound to get the operator's attention.

As engine controller 46 operates, it transmits packets on bus 44 indicative of the elapsed time the engine has been operated. Controller 38 receives this information, compares it with any time limit of engine operation that it received from transponder 20 and, if the vehicle is approaching the time limit of engine operation, transmits a packetized message to I/O controller 52 directing it to display a message indicative of the approaching time limit. Controller 52 will responsively display the requested message and will preferably energize annunciator 84 causing it to generate a sound to get the operator's attention.

Controller 38 also receives the data indicative of the vehicle's current position from receiver 58, and compares it with the data indicative of the permitted geographical area of operation received from transponder 20. If the vehicle is approaching the geographical limit of operation or has exceeded it, for example, controller 38 transmits a packet to I/O controller 52 directing it to generate a corresponding message. Controller 52 responsively displays that message.

Engine controller 46 is configured to transmit packets of data indicative of elapsed engine hours, engine RPM and engine load among other data. Controller 38 receives these packets and compares this data with the data indicative of permitted engine speed and engine load that were downloaded from transponder 20. If the engine RPM or load approaches the permitted engine RPM or load, controller 38 transmits a packet to I/O controller 52 indicative of these conditions. Controller 52 responsively transmits a message to display 84 indicates this condition. In addition, controller 38 transmits packetized data to engine controller 46 directing engine controller 46 to limit the RPM and load to the approved limits indicated by the data retrieved from transponder 20. Engine controller 46 will, in response, prevent the engine from exceeding the load and RPM limit by controlling the engine governor or throttle valve to maintain the engine at or below the load or RPM limit. Alternatively, controller 38 may be configured to transmit the engine speed and load limits to engine controller 46 on startup (when controller 38 reads the data stored in transponder 20), and engine controller 46 can be configured to maintain these speed and load limits by itself, without input from controller 38 by periodically comparing the actual speed and load with the speed and load limits sent to it by controller 38 and automatically preventing the engine from exceeding these limits.

Figure 4:
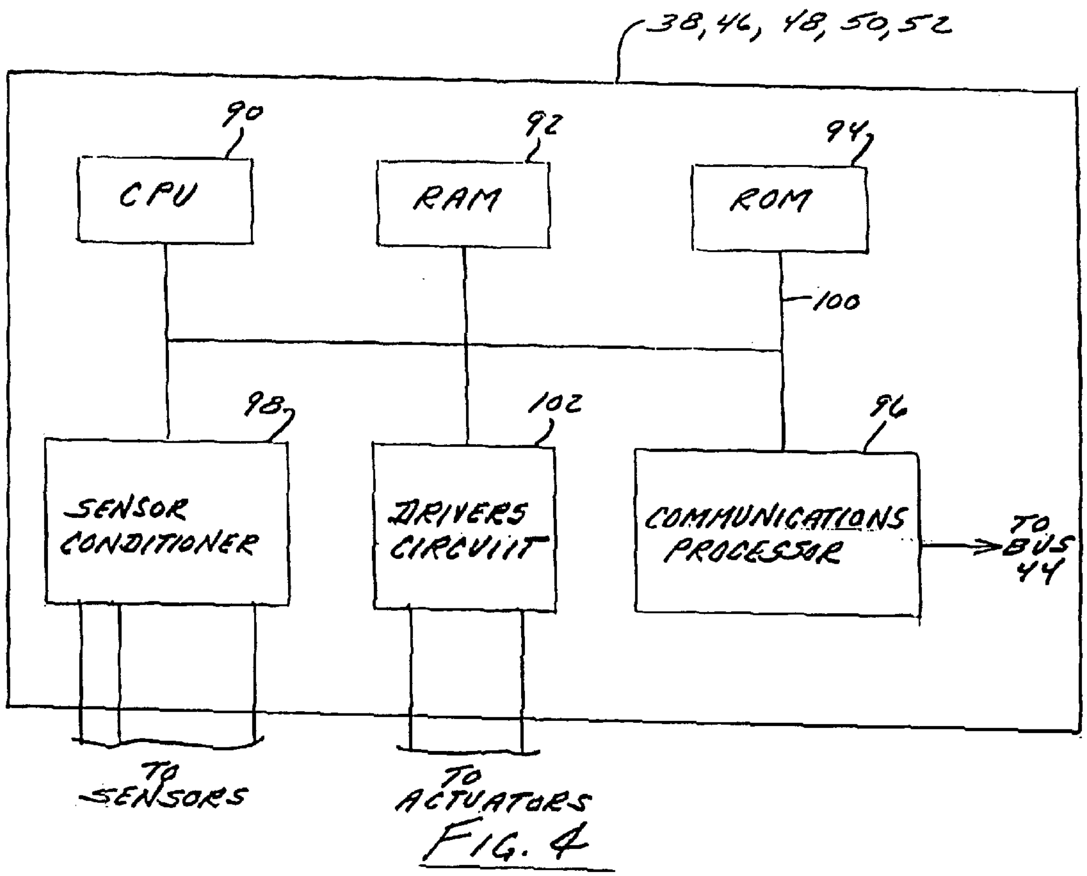
FIG. 4 illustrates an exemplary controller of those shown in FIG. 3.

Referring now to FIG. 4, each controller (including controller 38) of FIG. 3, has a microprocessor 90, RAM memory 92 and ROM memory 94, as well as a dedicated communications processor 96 configured to handle all communications over bus 44 with the other controllers on the bus (FIG. 3).

Each controller also includes a sensor conditioning circuit 98 that interfaces the sensor signals (such as sensors 66, levers 88, keyboard 80, switch 26) to bus 100. Circuit 98 filters and buffers the signals to eliminate noise, and may include sample-and-hold sub-circuits as well as analog-to-digital converters for processing analog sensor signals.

In addition, each controller includes a driver circuit 102 that controls the application of power to the actuators, including, without limitation, the valves driven by the transmission and auxiliary controllers, the fuel pump, governor and ignition system driven by the engine controller, and the electronic display driven by the I/O controller. The microprocessor, RAM, ROM, and communications processor are all coupled together by control/data/address bus 100 within each controller.

The ROM memory 94 contains the programmed instructions that control the operation of the microprocessor 90 in that controller.

The RAM memory 92 is used to store working variables required by the microprocessor. A particularly preferred processor for each of the controllers is a MC68HC11, MC68HC908AZ60, MPC555, or MPC565 microprocessors by Motorola. The preferred dedicated communications processor is any of the standalone CAN processors, such as those manufactured by Microchip or Phillips. the advantage to the Motorola 68HC908AZ60, the MPC555, and the MPC 565 processors is that they include both the communications processor and the microprocessor on the same die and therefore in a single package.

Thus, each of the controllers shown in FIG. 3 is coupled to the other controllers of FIG. 3 by a serial communications bus 44. Each controller has its own internal communications bus 100 that couples the microprocessor, RAM, ROM, and dedicated communications processor of each controller. Each controller likewise controls one or more different subsystems of the vehicle and receives necessary data regarding the control of its subsystems from the other controllers.

While the embodiments illustrated in the FIGURES and described above are presently preferred, it should be understood that these embodiments are offered by way of example only. For example, the principles of the present invention may find applications in automotive, agricultural and construction vehicles. The transponder may be a self-powered radio transmitter or transmitter/receiver. The invention is not limited to a particular embodiment, but extends to various modifications that nevertheless fall within the scope of the appended claims.

What is claimed is:

1. A method of controlling the operation of a vehicle including a radio communications circuit coupled to a microprocessor-based controller, the circuit being configured to communicate with a vehicle operator's handheld radio frequency transponder, the controller configured to control at least a plurality of hydraulic actuators, the method comprising the steps of:

a. providing the vehicle including the radio communications circuit, the controller and the plurality of actuators;

b. providing the radio transponder to the vehicle operator;

c. generating electromagnetic radiation from the radio communications circuit;

d. bringing the transponder within the range of the electromagnetic radiation;

e. energizing the transponder by the electromagnetic radiation;

f. transmitting data from the transponder after the step of energizing the transponder, the data being associated with the operator and indicating limits on use of the vehicle, the limits including a subsystem the operator is permitted to use, the subsystem including the plurality of hydraulic actuators;

g. receiving at the radio communications circuit the data transmitted by the transponder; and h. controlling at least one subsystem of the vehicle in response to the data received at the radio communications circuit including the step of:

the controller responsively disabling at least one subsystem.

2. The method of claim 1, wherein the step of providing the radio transponder includes the step of providing the radio transponder with a low-power microcontroller configured to receive its operating power from the electromagnetic radiation.

3. The method of claim 2, wherein the step of providing the radio transponder includes the step of molding the radio transponder into a vehicle ignition key.

4. The method of claim 2, wherein the step of providing a radio transponder includes the step of embedding the radio transponder in a hand-held card.

5. The method of claim 4, wherein the step of providing a radio transponder includes the step of mechanically bonding the radio transponder to a vehicle ignition key.

6. The method of claim 1, wherein the step of transmitting the data includes the step of transmitting a digital value that identifies the operator.

7. The method of claim 6, wherein the step of controlling at least one subsystem includes the step of comparing the digital value that identifies the operator with a value previously stored in the vehicle's controller.

8. The method of claim 1, wherein the step of controlling at least one subsystem of the vehicle includes the step of disabling the operation of one or more of the following subsystems:

a. a fuel pump of the vehicle;

b. a starting system of the vehicle;

c. an electrical system of the vehicle;

d. a transmission of the vehicle; and e. an engine of the vehicle.

9. A method for permitting a plurality of users of a work vehicle including a plurality of hydraulic actuators to have different degrees of operating access to the vehicle, each of the users having an operating key for operating the vehicle and a radio transponder coupled to the operating key for storing data indicative of the authorized degree of operating access to the vehicle, the method comprising:

transmitting first data indicative of a first authorized degree of operating access to a vehicle control system on the vehicle from a first transponder coupled to a first operating key for the vehicle;

comparing the first transmitted data with data stored in the vehicle control system to determine the first authorized degree of access and to provide a first user with the first authorized degrees of access;

using the first operating key to operate the vehicle;

transmitting second data indicative of a second authorized degree of operating access to the vehicle control system from a second transponder coupled to a second operating key for the vehicle;

comparing the second transmitted data with data stored in the vehicle control system to determine the second authorized degree of access and to provide a second user with the second authorized degree of access;

using the second operating key to operate the same vehicle at a time different than when the first operating key is being used;

wherein the first authorized degree of access and the second authorized degree of access represent different degrees of control of the plurality of hydraulic actuators.

10. The method of claim 9, wherein the first and second authorized degrees of access are different according to at least one of the following characteristics: total distance of authorized operation, geographical areas of authorized operation, specific hours during a day when the vehicle may be operated, dates or days of the week when the vehicle may be operated, and total time of authorized operation.

11. The method of claim 9, wherein the vehicle includes at least one of an engine-ignition subsystem, an engine-fuel-pump subsystem, and an engine-starting subsystem, and the user is limited to controlling subsystems according to data in the user's transponder.

12. The method of claim 9, wherein data indicative of the first and the second authorized degree of access includes conditional limits that prevent the use of the vehicle if the conditional limits are exceeded.

13. The method of claim 12, wherein data indicative of the conditional limits are communicated from the transponder and include data indicative of one or more of the following: the total hours of authorized use, the total distance of authorized travel, the maximum speed of authorized operation, the maximum load on the engine and the geographical area in which the vehicle is authorized to operate.

14. A system for permitting different authorized degrees of access for a plurality of users of a vehicle, comprising:

a first radio transponder storing data indicative of a first authorized degree of access to the vehicle;

a second radio transponder storing data indicative of a second authorized degree of access to the vehicle, wherein the first authorized degree of access is different from the second authorized degree of access;

an operating switch and first and second operating keys configured to operate the operating switch, wherein the first and second operating keys are coupled to the first and second transponders; and an electronic control system mounted on the vehicle and configured to provide different authorized degrees of access to the vehicle to a first user and a second user based on the data indicative of the first and second authorized degree of access stored in the first and second transponders, the electronic control system including a radio transmitter and a reader circuit, the radio transmitter configured to energize the first transponder when the first operating key is located proximate to the operating switch and the second transponder when the second operating key is located proximate to the operating switch, the reader circuit configured to read the data from the first and second radio transponders when a respective one of the first and second transponders is energized, and the data received from the first transponder and the data received from the second transponder each includes data indicative of the level of control of a hydraulic subsystem given to the first and second user, respectively.

15. The system of claim 14, further comprising a display adapted to display a message indicating data stored in the transponder.

16. The system of claim 14, wherein the first and second authorized degrees of access differ by at least one characteristic selected from the group of characteristics including: allowed times and dates of operation, hours during the day when the vehicle may be operated, total time of authorized operation, and a subsystem that the operator is authorized to operate.

17. The system of claim 16, wherein the subsystem includes at least one of an engine-ignition subsystem, an engine-fuel-supply subsystem, and an engine-starting subsystem.

18. The system of claim 14, wherein the hydraulic subsystem includes an auxiliary hydraulic controller that controls the flow of hydraulic fluid to at least a lift cylinder and a bucket cylinder, and further wherein the control system permits the first user and the second user to differently operate the cylinders based upon data in at least one of the first and second transponders that is transmitted to the control system.

19. The system of claim 14, wherein the first and the second authorized degrees of access include conditional limitations that limit the use of a portion of the vehicle if the conditional limitations are exceeded.

20. The system of claim 19, wherein data indicative of the conditional limitations are downloaded from at least one of the first and second transponders to the vehicle control system and are indicative of one or more of the following: the number of hours of authorized use, the total distance of authorized travel, the maximum speed of authorized operation, and the maximum load on an engine.

21. The system of claim 14, wherein the control system is configured to transmit vehicle data indicative of vehicle operation to at least one of the first and second transponders via the radio transmitter, wherein the vehicle data includes data indicative of at least one of the distance traveled by the vehicle, the date and time the vehicle was started, service reminders, engine load, odometer reading and fault conditions.

* * * * *